(12) United States Patent
Chen et al.

(10) Patent No.: US 12,478,915 B2
(45) Date of Patent: Nov. 25, 2025

(54) SYSTEM AND METHOD FOR SYNCHRONOUSLY RECOVERING NITROGEN AND CARBON DIOXIDE FROM BOILER FLUE GAS

(71) Applicants: DALIAN UNIVERSITY OF TECHNOLOGY, Dalian (CN); BEIJING CARBON CYCLE TECHNOLOGY, Beijing (CN)

(72) Inventors: Shaoyun Chen, Beijing (CN); Yuxue Li, Beijing (CN); Li Qi, Beijing (CN); Yongchun Zhang, Beijing (CN)

(73) Assignees: DALIAN UNIVERSITY OF TECHNOLOGY, Dalian (CN); BEIJING CARBON CYCLE TECHNOLOGY, Beijing (CN)

( * ) Notice: Subject to any disclaimer, the term of this patent is extended or adjusted under 35 U.S.C. 154(b) by 378 days.

(21) Appl. No.: 18/447,072

(22) Filed: Aug. 9, 2023

(65) Prior Publication Data
US 2023/0381712 A1   Nov. 30, 2023

Related U.S. Application Data

(63) Continuation of application No. PCT/CN2022/124845, filed on Oct. 12, 2022.

(30) Foreign Application Priority Data

Oct. 19, 2021   (CN) .......................... 202111216165.9

(51) Int. Cl.
*F25J 3/02*   (2006.01)
*B01D 53/04*   (2006.01)
(Continued)

(52) U.S. Cl.
CPC ....... *B01D 53/053* (2013.01); *B01D 53/0423* (2013.01); *B01D 53/0446* (2013.01);
(Continued)

(58) Field of Classification Search
CPC .... B01D 53/053; B01D 53/04; B01D 53/261; B01D 53/0423; B01D 53/0446;
(Continued)

(56) References Cited

U.S. PATENT DOCUMENTS 4,813,980 A * 3/1989 Sircar ....................... C01B 3/56
                                                    95/139
4,913,709 A * 4/1990 Kumar ............... B01D 53/0476
                                                    95/100
(Continued)

FOREIGN PATENT DOCUMENTS

CN   105749699 A   7/2016
CN   107899376 A   4/2018
(Continued)

OTHER PUBLICATIONS

Internation Search Report of PCT/CN2022/124845, Mailed Dec. 15, 2022.

*Primary Examiner* — Frank M Lawrence, Jr.

(57) ABSTRACT

A system for synchronously recovering nitrogen and carbon dioxide from boiler flue gas includes: a flue gas pretreatment system used for dehydrating and cooling boiler flue gas; a carbon and nitrogen separation system communicated with the flue gas pretreatment system, and used for performing pressure swing adsorption on the pretreated flue gas and separating the nitrogen-containing vent gas and the crude carbon dioxide gas; a carbon dioxide secondary purification system communicated with the carbon and nitrogen separation system, and used for performing secondary purification on the crude carbon dioxide gas separated from the carbon and nitrogen separation system; and a nitrogen
(Continued)

concentration and purification system communicated with the carbon and nitrogen separation system and the carbon dioxide secondary purification system, and used for purifying the nitrogen-containing vent gas separated from the carbon and nitrogen separation system and the vent gas generated by the carbon dioxide secondary purification system.

9 Claims, 6 Drawing Sheets

(51) Int. Cl.
    *B01D 53/053*     (2006.01)
    *B01D 53/26*     (2006.01)
    *C01B 21/04*     (2006.01)
    *F23J 15/00*     (2006.01)

(52) U.S. Cl.
    CPC ........ *B01D 53/265* (2013.01); *B01D 2256/10* (2013.01); *B01D 2256/22* (2013.01); *B01D 2257/302* (2013.01); *B01D 2258/0283* (2013.01)

(58) Field of Classification Search
    CPC .............. B01D 53/265; B01D 2256/10; B01D 2256/22; B01D 2257/302; B01D 2258/0283; B01D 53/0462; B01D 53/047; Y02C 20/40; C01B 21/04; C01B 32/50; F23J 15/00
    USPC ...... 95/117, 139; 96/108, 121, 131, 132, 134
    See application file for complete search history.

(56) References Cited

U.S. PATENT DOCUMENTS

| | | | | |
|---|---|---|---|---|
| 4,988,490 | A | * | 1/1991 | Nicholas .............. B01D 53/047 |
| | | | | 423/652 |
| 5,133,785 | A | * | 7/1992 | Kumar .............. B01D 53/0476 |
| | | | | 95/143 |
| 2017/0136400 | A1 | | 5/2017 | Sundaram et al. |
| 2017/0136401 | A1 | * | 5/2017 | Sundaram ........... F01N 13/0093 |
| 2018/0036670 | A1 | * | 2/2018 | Sundaram .......... B01D 53/0407 |
| 2024/0263873 | A1 | * | 8/2024 | Han ...................... F25J 3/0257 |

FOREIGN PATENT DOCUMENTS

| | | | |
|---|---|---|---|
| CN | 110498416 A | 11/2019 | |
| CN | 210825439 U | 6/2020 | |
| CN | 113184850 A | 7/2021 | |
| CN | 215161044 U | 12/2021 | |
| CN | 216191090 U | 4/2022 | |
| CN | 216404319 U | 4/2022 | |
| EP | 0469781 A2 * | 2/1992 | ............. B01D 53/00 |

\* cited by examiner

SYSTEM AND METHOD FOR SYNCHRONOUSLY RECOVERING NITROGEN AND CARBON DIOXIDE FROM BOILER FLUE GAS

TECHNICAL FIELD

The present disclosure belongs to the technical field of recovery and utilization of the boiler flue gas, and particularly relates to a system and method for synchronously recovering nitrogen and carbon dioxide from boiler flue gas.

BACKGROUND OF THE PRESENT DISCLOSURE

The capture and reuse of the carbon dioxide in the coal-fired boiler flue gas is an important measure to achieve the dual carbon goal. And, in the vent gas after recovering the carbon dioxide, the nitrogen content in that is about 90%, the recycling of nitrogen can not only improve the efficiency of nitrogen production, but also reduce the energy consumption and further reduce the carbon emission.

Chinese patent application CN107899376A discloses a "combined capture and recovery device and method for carbon dioxide and nitrogen from flue gas", this device comprises a flue gas treatment system, a first $CO_2$ membrane separation unit, a second $CO_2$ membrane separation unit and a $N_2$ membrane separation unit. This device belongs to the membrane recovery mode, although it can capture the carbon dioxide and the nitrogen at the same time, the product purity is low, the membrane barrel has a high requirement for gas source cleanliness, the equipment is easily blocked during use, the service life is short, and the membrane barrel has a high price, which is not suitable for industrial large-scale production.

Chinese patent application CN110498416A discloses a "system for synchronous recovery of carbon dioxide and nitrogen from boiler flue gas in coal-fired power plant", which comprises a flue gas pretreatment system, a PSA1 system, a PSA2 system, a carbon dioxide compression and purification system, a carbon dioxide rectification and storage system and a PSA high-purity nitrogen preparation system. This system can capture the carbon dioxide and the nitrogen to the maximum extent, and the product purity is high, but there are some problems such as inflexible equipment operation, high energy consumption. When the nitrogen production of the later stage is reduced or the capture is not performed, the pressure compression value of the earlier stage is too high and the power consumption is large.

Accordingly, there is a need to provide an improved solution to the above-mentioned deficiencies of the prior art.

SUMMARY OF PRESENT DISCLOSURE

It is an object of the present disclosure to provide a system and method for synchronously recovering nitrogen and carbon dioxide from boiler flue gas, in order to solve or alleviate the problems existing in the prior art.

In order to achieve the above-mentioned object, the present disclosure provides the following technical solutions.

A system for synchronously recovering nitrogen and carbon dioxide from boiler flue gas includes:
a flue gas pretreatment system used for dehydrating and cooling a boiler flue gas;
a carbon and nitrogen separation system communicated with the flue gas pretreatment system, and used for performing pressure swing adsorption on a pretreated flue gas and separating a nitrogen-containing vent gas and a crude carbon dioxide gas, an adsorption pressure of the carbon and nitrogen separation system being 0.20-0.40 MPa;
a carbon dioxide secondary purification system communicated with the carbon and nitrogen separation system, and used for performing secondary purification on the crude carbon dioxide gas separated from the carbon and nitrogen separation system; and
a nitrogen concentration and purification system communicated with the carbon and nitrogen separation system and the carbon dioxide secondary purification system, and used for purifying the nitrogen-containing vent gas separated from the carbon and nitrogen separation system and a vent gas generated by the carbon dioxide secondary purification system.

In the system for synchronously recovering nitrogen and carbon dioxide from boiler flue gas as described above, alternatively, the flue gas pretreatment system includes a first cooler, a first gas-liquid separator and a flue gas induced draught fan, and an inlet of the first cooler is communicated with a boiler flue, an outlet of the first cooler is communicated with an inlet of the first gas-liquid separator, an outlet of the first gas-liquid separator is communicated with an inlet of the flue gas induced draught fan, and an outlet of the flue gas induced draught fan is communicated with the carbon and nitrogen separation system.

In the system for synchronously recovering nitrogen and carbon dioxide from boiler flue gas as described above, alternatively, the carbon and nitrogen separation system includes a flue gas compressor, a second gas-liquid separator, a first dryer, a first adsorption column set, a first vacuum pump, and a first buffer tank, and the first adsorption column set includes a plurality of first adsorption columns arranged in parallel, each first adsorption column is filled with a first adsorbent; wherein, an inlet of the flue gas compressor is communicated with the flue gas pretreatment system, an outlet of the flue gas compressor is communicated with an inlet of the second gas-liquid separator, an outlet of the second gas-liquid separator is communicated with an inlet of the first dryer, an outlet of the first dryer is communicated with a gas inlet of the first adsorption column set, a top vent gas of the first adsorption column set is a nitrogen-containing vent gas, a bottom vent gas is a crude carbon dioxide gas, a column-top gas outlet of the first adsorption column set is communicated with the nitrogen concentration and purification system, a column-bottom gas outlet of the first adsorption column set is communicated with an inlet of the first vacuum pump, an outlet of the first vacuum pump is communicated with an inlet of the first buffer tank, and an outlet of the first buffer tank is communicated with the carbon dioxide secondary purification system.

In the system for synchronously recovering nitrogen and carbon dioxide from boiler flue gas as described above, alternatively, a volume concentration of nitrogen in the nitrogen-containing vent gas is 88%-90%, and a volume concentration of carbon dioxide in the crude carbon dioxide gas is 45%-80%.

In the system for synchronously recovering nitrogen and carbon dioxide from boiler flue gas as described above, alternatively, the carbon dioxide secondary purification system includes a first carbon dioxide compressor, a third gas-liquid separator, a second adsorption column set, a second vacuum pump and a second buffer tank, and the second adsorption column set includes a plurality of second adsorption columns arranged in parallel, and each second adsorption column is filled with a second adsorbent; wherein, an inlet of the first carbon dioxide compressor is communicated with the carbon and nitrogen separation system, an outlet of the first carbon dioxide compressor is communicated with an inlet of the third gas-liquid separator, an outlet of the third gas-liquid separator is communicated with a gas inlet of the second adsorption column set, a column-top gas outlet of the second adsorption column set is communicated with the nitrogen concentration and purification system, a column-bottom gas outlet of the second adsorption column set is communicated with an inlet of the second vacuum pump, and an outlet of second vacuum pump is communicated with an inlet of the second buffer tank.

In the system for synchronously recovering nitrogen and carbon dioxide from boiler flue gas as described above, alternatively, the nitrogen concentration and purification system includes a third buffer tank, a nitrogen compressor, a second dryer, a filter and a third adsorption column set, and the third adsorption column set includes a plurality of third adsorption columns arranged in parallel, and the third adsorption columns are filled with a third adsorbent; wherein, an inlet of the third buffer tank is communicated with the carbon and nitrogen separation system and the carbon dioxide secondary purification system, an outlet of the third buffer tank is communicated with an inlet of the nitrogen compressor, an outlet of the nitrogen compressor is communicated with an inlet of the second dryer, an outlet of the second dryer is communicated with an inlet of the filter, an outlet of the filter is communicated with a gas inlet of the third adsorption column set, and a product nitrogen is obtained at a top gas outlet of the third adsorption column set.

In the system for synchronously recovering nitrogen and carbon dioxide from boiler flue gas as described above, alternatively, an adsorption pressure of the third adsorption column is 0.7-1.0 MPa, and a volume concentration of the product nitrogen is 99%-99.999%.

In the system for synchronously recovering nitrogen and carbon dioxide from boiler flue gas as described above, alternatively, the system also includes a carbon dioxide refining and liquefaction system, and the carbon dioxide refining and liquefaction system is communicated with the carbon dioxide secondary purification system for refining the carbon dioxide.

In the system for synchronously recovering nitrogen and carbon dioxide from boiler flue gas as described above, alternatively, the carbon dioxide refining and liquefaction system includes a second cooler, a fourth gas-liquid separator, a second carbon dioxide compressor, a fourth buffer tank, a desulfurization column set, a drying column set, a third cooler, a liquefaction module, a distillation module and a carbon dioxide storage tank; wherein, an inlet of the second cooler is communicated with the carbon dioxide secondary purification system, an outlet of the second cooler is communicated with an inlet of the fourth gas-liquid separator, an outlet of the fourth gas-liquid separator is communicated with an inlet of the second carbon dioxide compressor, an outlet of the second carbon dioxide compressor is communicated with an inlet of the fourth buffer tank, an outlet of the fourth buffer tank is communicated with an inlet of the desulfurization column set, an outlet of the desulfurization column set is communicated with an inlet of the drying column set, an outlet of the drying column set is communicated with an inlet of the third cooler, an outlet of the third cooler is communicated with an inlet of the liquefaction module, an outlet of the liquefaction module is communicated with an inlet of the distillation module, and a bottom outlet of the distillation module is communicated with the carbon dioxide storage tank.

The present disclosure also provides a method for synchronously recovering nitrogen and carbon dioxide from boiler flue gas, which uses the system for synchronously recovering nitrogen and carbon dioxide from boiler flue gas as described above, the method includes the following steps:

step (1): introducing the boiler flue gas into the flue gas pretreatment system for dehydrating and cooling to obtain the pretreated flue gas;

step (2): introducing the pretreated flue gas into the carbon and nitrogen separation system, performing pressure swing adsorption pretreatment, and separating the nitrogen-containing vent gas and the crude carbon dioxide gas, wherein, the adsorption pressure of the carbon and nitrogen separation system is 0.20-0.40 MPa;

step (3): introducing the crude carbon dioxide gas separated from the carbon and nitrogen separation system into the carbon dioxide secondary purification system for secondary purification to obtain a purified carbon dioxide gas and generate the nitrogen-containing vent gas;

step (4): introducing the nitrogen-containing vent gas separated from the carbon and nitrogen separation system and the nitrogen-containing vent gas generated by the carbon dioxide secondary purification system into the nitrogen concentration and purification system for purifying to obtain the product nitrogen;

preferably, after step (3), the method for synchronously recovering nitrogen and carbon dioxide from boiler flue gas also includes: step (31), introducing the purified carbon dioxide gas into the carbon dioxide refining and liquefaction system for refining treatment to obtain a refined carbon dioxide gas.

Advantageous Effects

The present disclosure has achieved the following technical effects compared to the prior art.

(1) The system for synchronously recovering nitrogen and carbon dioxide from boiler flue gas of the present disclosure can recover carbon dioxide and nitrogen to the greatest extent, and generates no three wastes. And, the carbon and nitrogen separation system of the present disclosure uses a low-pressure adsorption mode of 0.20-0.40 MPa to separate carbon dioxide and nitrogen, which changes the prior art of adsorption at 1.0 MPa and effectively reduces energy consumption.

(2) The desorption gas in the carbon and nitrogen separation system of the present disclosure adopts vacuum pump desorption for desorbing, which not only reduces energy consumption but also improves the recovery rate of carbon dioxide.

(3) The nitrogen concentration and purification system of the present disclosure adopts a secondary compression mode, which involves a secondary pressure increase process, and the model and compression pressure of the compressor can be selected based on the actual nitrogen content demanded by the users, thereby further achieving the goal of energy conservation.

DESCRIPTION OF THE DRAWINGS

The drawings, which form a part of the present disclosure, are used to provide a further understanding of the present disclosure. The schematic examples and explanations of the present disclosure are used to explain the present disclosure and do not constitute an improper limitation of the present disclosure. Wherein.

In the drawings:
1—flue gas pretreatment system; 2—carbon and nitrogen separation system; 3—carbon dioxide secondary purification system; 4—carbon dioxide refining and liquefaction system; 5—nitrogen concentration and purification system; 11—first cooler; 12—first gas-liquid separator; 13—flue gas induced draught fan;
21—flue gas compressor; 22—second gas-liquid separator; 23—first dryer; 24—first adsorption column set; 25—first vacuum pump;
31—first carbon dioxide compressor; 32—third gas-liquid separator; 33—second adsorption column set; 34—second vacuum pump; 35—second buffer tank;
41—second cooler; 42—fourth gas-liquid separator; 43—second carbon dioxide compressor; 43a—fourth buffer tank; 44—desulfurization column set; 45—drying column set; 46—third cooler; 47—liquefaction module; 48—distillation module; 49—carbon dioxide storage tank;
51—third buffer tank; 52—nitrogen compressor; 53—second dryer; 54—filter; 55—third adsorption column set.

DETAILED DESCRIPTION OF EMBODIMENTS

The technical solutions in the examples of the present disclosure will be described clearly and completely in the following, and it is obvious that the described examples are only a part of the examples of the present disclosure, but not all of the examples. Based on the examples of the present disclosure, all other examples obtained by a person skilled in the art are within the scope of the present disclosure.

The following will provide a detailed explanation of the present disclosure in conjunction with examples. It should be noted that, without conflict, the examples of the present disclosure and the features in the examples can be combined with each other.

Figure 1:
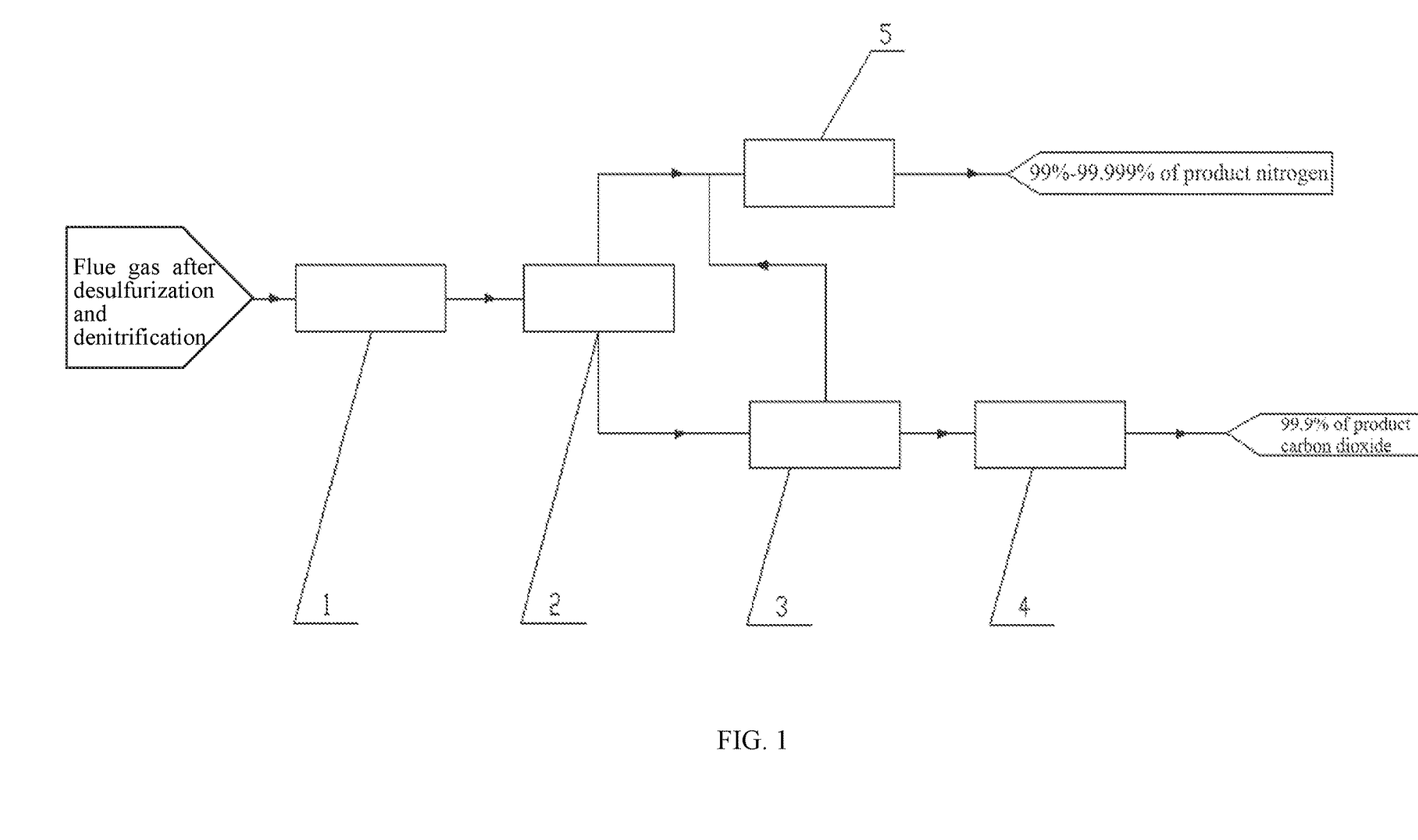
FIG. 1 is a schematic flowchart of the system for synchronously recovering nitrogen and carbon dioxide from boiler flue gas in the example of the present disclosure.

With regard to the problems existing in the prior art, the present disclosure provides an energy-saving system for synchronously recovering nitrogen and carbon dioxide from boiler flue gas, as shown in FIG. 1, the system includes: the flue gas pretreatment system 1, the carbon and nitrogen separation system 2, the carbon dioxide secondary purification system 3, the carbon dioxide refining and liquefaction system 4 and the nitrogen concentration and purification system 5.

Wherein, the flue gas pretreatment system 1 is used for dehydrating and cooling the boiler flue gas; the carbon and nitrogen separation system 2 is communicated with the flue gas pretreatment system 1, and is used for performing pressure swing adsorption on the pretreated flue gas and separating the nitrogen-containing vent gas and the crude carbon dioxide gas, the adsorption pressure of the carbon and nitrogen separation system 2 is 0.20-0.40 MPa; the carbon dioxide secondary purification system 3 is communicated with the carbon and nitrogen separation system 2, and is used for performing secondary purification on the crude carbon dioxide gas separated from the carbon and nitrogen separation system 2; the nitrogen concentration and purification system 5 is communicated with the carbon and nitrogen separation system 2 and the carbon dioxide secondary purification system 3, and is used for purifying the nitrogen-containing vent gas separated from the carbon and nitrogen separation system 2 and the vent gas generated by the carbon dioxide secondary purification system 3; the carbon dioxide refining and liquefaction system 4 is communicated with the carbon dioxide secondary purification system 3 for refining the carbon dioxide.

The carbon and nitrogen separation system uses a low-pressure adsorption mode of 0.20-0.40 MPa (such as 0.20 MPa, 0.22 MPa, 0.25 MPa, 0.25 MPa, 0.27 MPa, 0.30 MPa, 0.32 MPa, 0.35 MPa, 0.37 MPa or 0.40 MPa) to separate carbon dioxide and nitrogen, which changes the prior art of adsorption at 1.0 MPa and effectively reduces energy consumption.

Figure 2:
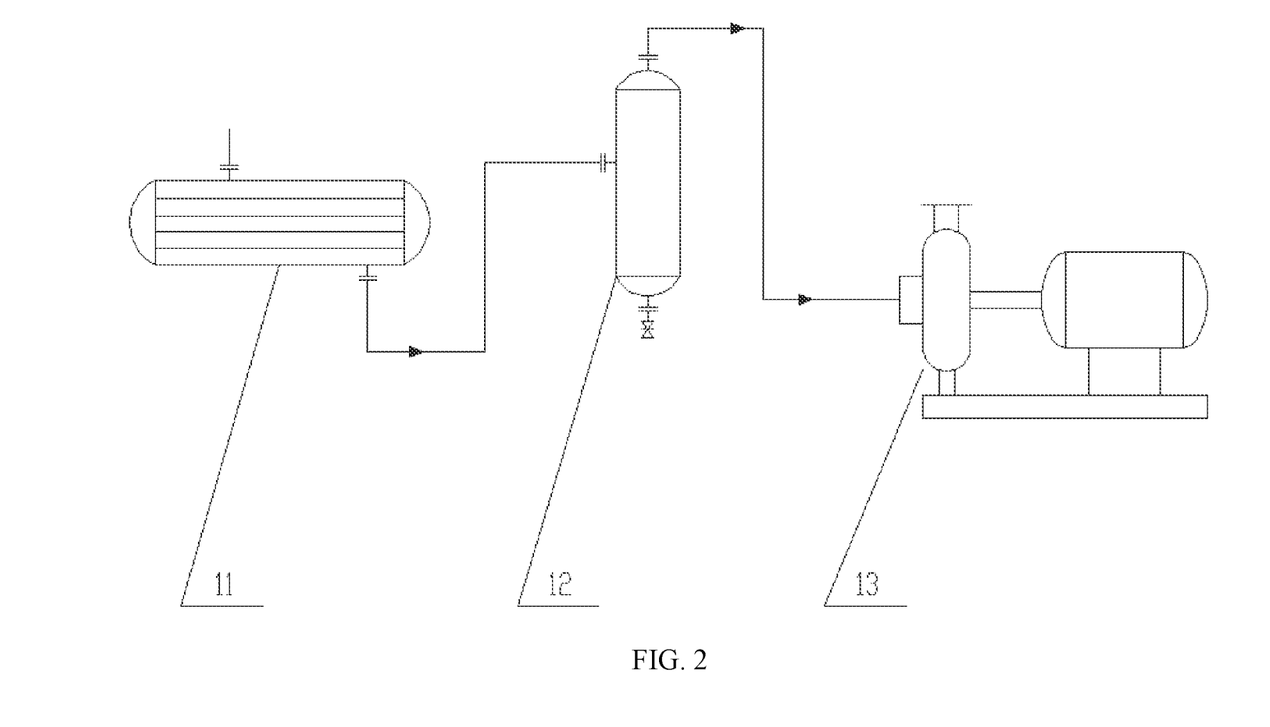
FIG. 2 is a schematic flowchart of the flue gas pretreatment system in the example of the present disclosure.

As shown in FIG. 2, in the optional example of the present disclosure, the flue gas pretreatment system 1 includes the first cooler 11, the first gas-liquid separator 12 and the flue gas induced draught fan 13, and the inlet of the first cooler 11 is communicated with the boiler flue, the outlet of the first cooler 11 is communicated with the inlet of the first gas-liquid separator 12, the outlet of the first gas-liquid separator 12 is communicated with the inlet of the flue gas induced draught fan 13, and the outlet of the flue gas induced draught fan 13 is communicated with the carbon and nitrogen separation system 2.

Figure 3:
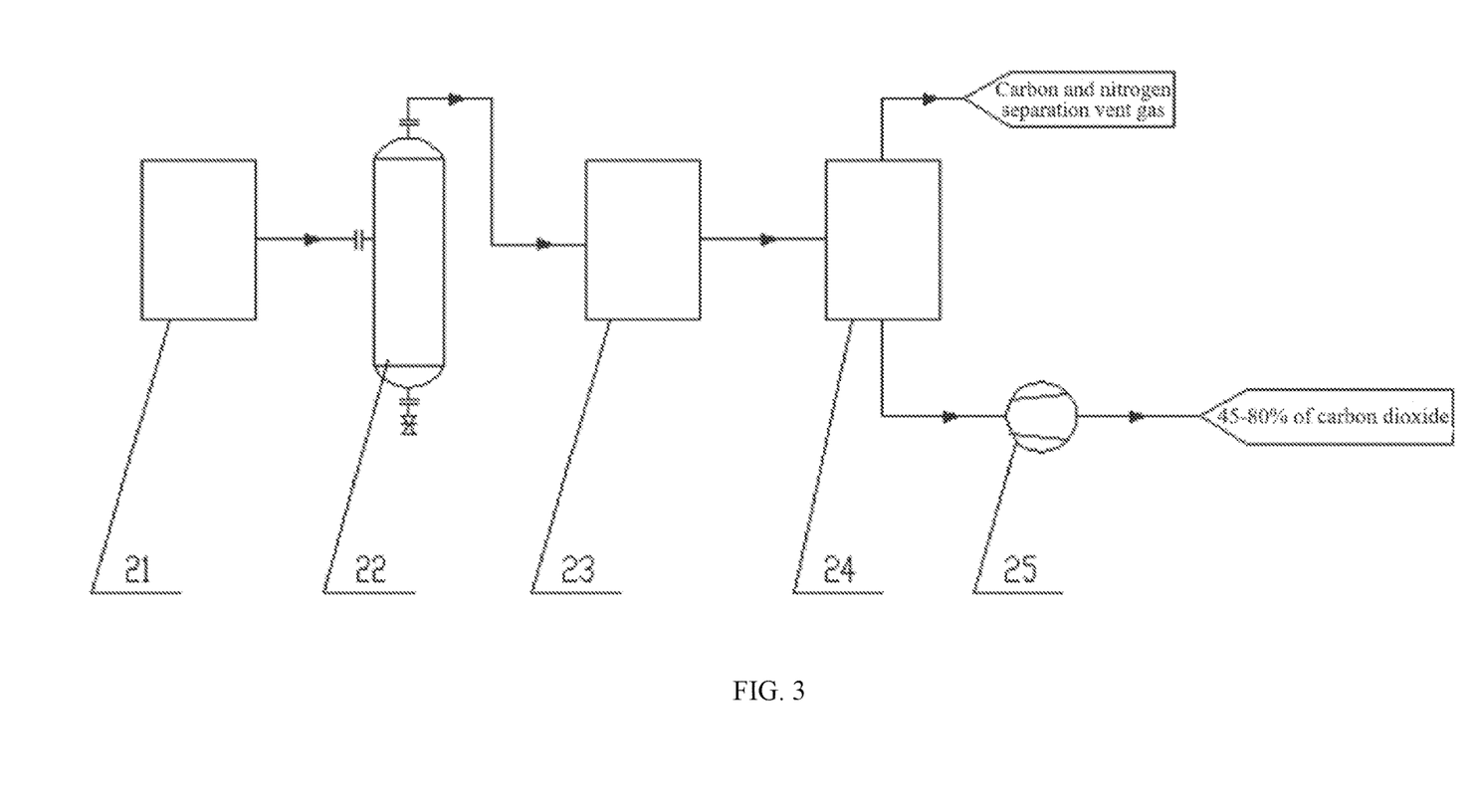
FIG. 3 is a schematic flowchart of the carbon and nitrogen separation system in the example of the present disclosure.

As shown in FIG. 3, in the optional example of the present disclosure, the carbon and nitrogen separation system 2 includes the flue gas compressor 21, the second gas-liquid separator 22, the first dryer 23, the first adsorption column set 24, the first vacuum pump 25 and the first buffer tank (not shown), the first adsorption column set 24 includes the plurality of first adsorption columns arranged in parallel, each first adsorption column is filled with the first adsorbent; wherein, the inlet of the flue gas compressor 21 is communicated with the outlet of the flue gas induced draught fan 13 of the flue gas pretreatment system 1, the outlet of the flue gas compressor 21 is communicated with the inlet of the second gas-liquid separator 22, the outlet of the second gas-liquid separator 22 is communicated with the inlet of the first dryer 23, the outlet of the first dryer 23 is communicated with the gas inlet of the first adsorption column set 24, the top vent gas of the first adsorption column set 24 is the nitrogen-containing vent gas, the bottom vent gas is the crude carbon dioxide gas, the column-top gas outlet of the first adsorption column set 24 is communicated with the nitrogen concentration and purification system 5, the column-bottom gas outlet of the first adsorption column set 24 is communicated with the inlet of the first vacuum pump 25, the outlet of the first vacuum pump 25 is communicated with the inlet of the first buffer tank, and the outlet of the first buffer tank is communicated with the carbon dioxide secondary purification system 3.

The volume concentration of nitrogen in the nitrogen-containing vent gas of the present disclosure is 88%-90%

(such as 88%, 89% or 90%), and the volume concentration of carbon dioxide in the crude carbon dioxide gas is 45%-80% (such as 45%, 46%, 47%, 48%, 49%, 50%, 60%, 70% or 80%).

Furthermore, the first pneumatic valve is disposed on the pipeline which is connected to the outlet of the flue gas compressor 21, the first solenoid valve is disposed on the first pneumatic valve, and the first solenoid valve is electrically connected to the PLC, so that the first pneumatic valve is controlled by the PLC through the first solenoid valve.

In this example, the flue gas treated by the flue gas pretreatment system 1 is lifted to a compressed flue gas of about 0.25 MPa by the flue gas compressor 21, and is entered into the first adsorption column set 24. The first pneumatic valve is controlled by the PLC through the first solenoid valve to ensure the different working states of different first adsorption columns. The column-top gas is nitrogen-enriched gas, which is entered into the nitrogen concentration and purification system as the feed gas, and the column-bottom gas is about 50% crude carbon dioxide gas as the lower level feed gas.

Figure 4:
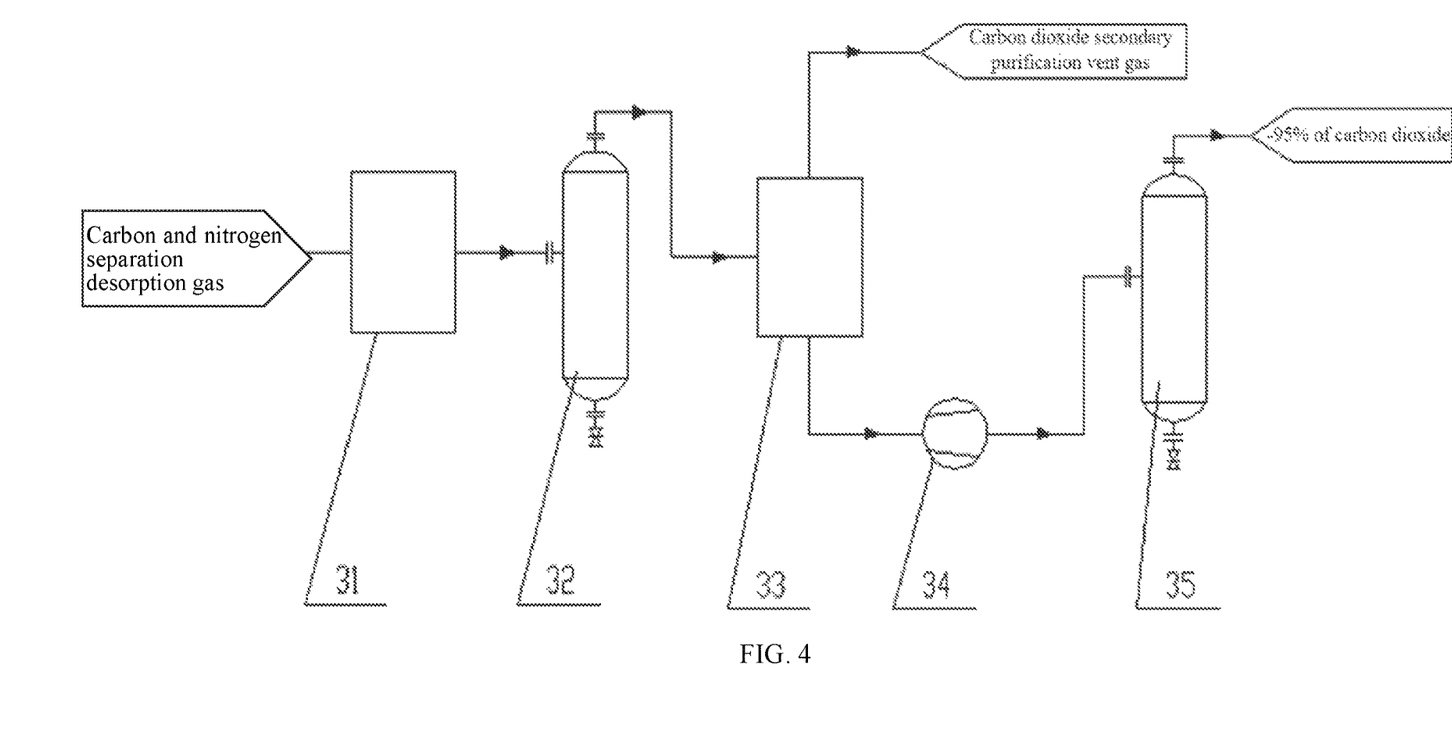
FIG. 4 is a schematic flowchart of the carbon dioxide secondary purification system in the example of the present disclosure.

As shown in FIG. 4, in the optional example of the present disclosure, the carbon dioxide secondary purification system 3 includes the first carbon dioxide compressor 31, the third gas-liquid separator 32, the second adsorption column set 33, the second vacuum pump 34 and the second buffer tank 35, and the second adsorption column set 33 includes the plurality of second adsorption columns arranged in parallel, each second adsorption column is filled with the second adsorbent; wherein, the inlet of the first carbon dioxide compressor 31 is communicated with the outlet of first buffer tank in the carbon and nitrogen separation system 2, the outlet of the first carbon dioxide compressor 31 is communicated with the inlet of the third gas-liquid separator 32, the outlet of the third gas-liquid separator 32 is communicated with the gas inlet of the second adsorption column set 33, the column-top gas outlet of the second adsorption column set 33 is communicated with the nitrogen concentration and purification system 5, the column-bottom gas outlet of the second adsorption column set 33 is communicated with the inlet of the second vacuum pump 34, and the outlet of second vacuum pump 34 is communicated with the inlet of the second buffer tank 35.

Preferably, the second pneumatic valve is disposed on the pipeline which is connected to the outlet of the first carbon dioxide compressor 31, the second solenoid valve is disposed on the second pneumatic valve, and the second solenoid valve is electrically connected to the PLC, so that the second pneumatic valve is controlled by the PLC through the second solenoid valve.

In this example, a plurality of second adsorption columns are disposed, and the second pneumatic valve is controlled by the PLC through the second solenoid valve to ensure the different working states of different second adsorption columns. The column-top gas is nitrogen-enriched gas, which is entered into the nitrogen concentration and purification system as the feed gas or vent, and the column-bottom gas is about 95% crude carbon dioxide gas, which is used as the feed gas for refining carbon dioxide.

Figure 5:
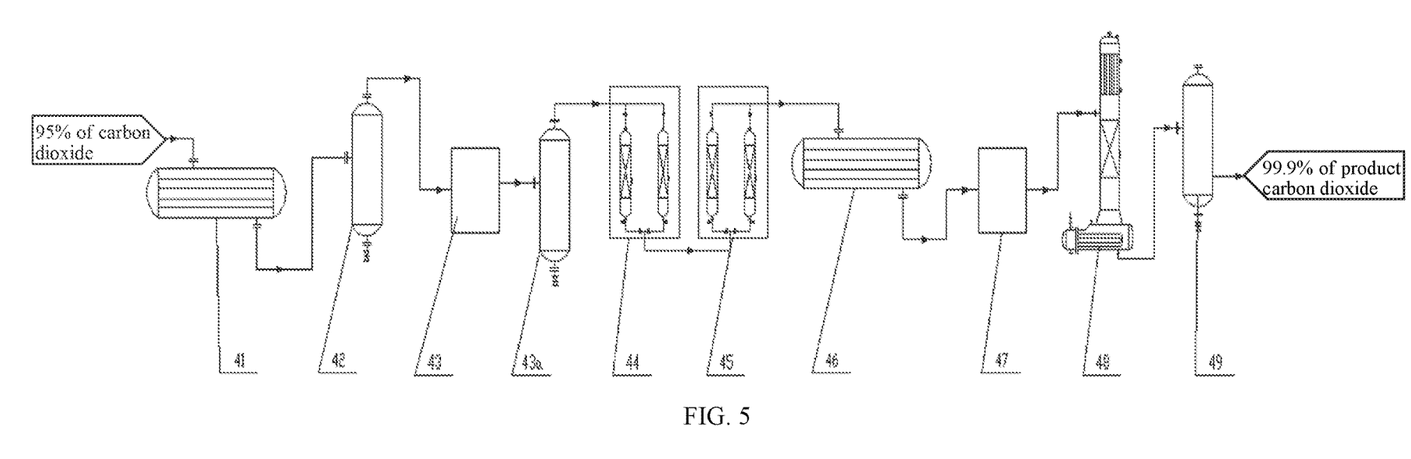
FIG. 5 is a schematic flowchart of the carbon dioxide refining and liquefaction system in the example of the present disclosure.

As shown in FIG. 5, in the optional example of the present disclosure, the carbon dioxide refining and liquefaction system 4 includes the second cooler 41, the fourth gas-liquid separator 42, the second carbon dioxide compressor 43, the fourth buffer tank 43a, the desulfurization column set 44, the drying column set 45, the third cooler 46, the liquefaction module 47, the distillation module 48 and the carbon dioxide storage tank 49; wherein, the inlet of the second cooler 41 is communicated with the desorption gas of the carbon dioxide secondary purification system 3 (i.e. is communicated with the outlet of the second buffer tank 35), the outlet of the second cooler 41 is communicated with the inlet of the fourth gas-liquid separator 42, the outlet of the fourth gas-liquid separator 42 is communicated with the inlet of the second carbon dioxide compressor 43, the carbon dioxide gas, which is compressed to 2.5 MPa, is entered from the outlet of the second carbon dioxide compressor 43 into the inlet of the fourth buffer tank 43a, the outlet of the fourth buffer tank 43a is communicated with the inlet of the desulfurization column set 44, and after desulfurization by impurity sulfur, it is entered from the outlet of the desulfurization column set 44 into the inlet of the drying column set 45 for deep drying and water removal, and the outlet of the drying column set 45 is communicated with the inlet of the third cooler 46 for cooling treatment, the outlet of the third cooler 46 is communicated with the inlet of the liquefaction module 47, the outlet of the liquefaction module 47 is communicated with the inlet of the distillation module 48, and the distilled food grade carbon dioxide product with a volume concentration of >99.9% is entered from the bottom outlet of the distillation module 48 into the carbon dioxide storage tank 49 for storing.

It should be noted that the desulfurization column set 44 includes a plurality of desulfurization columns arranged in parallel, the drying column set 45 includes a plurality of the drying columns arranged in parallel, and the distillation module 48 includes the distillation column.

Figure 6:
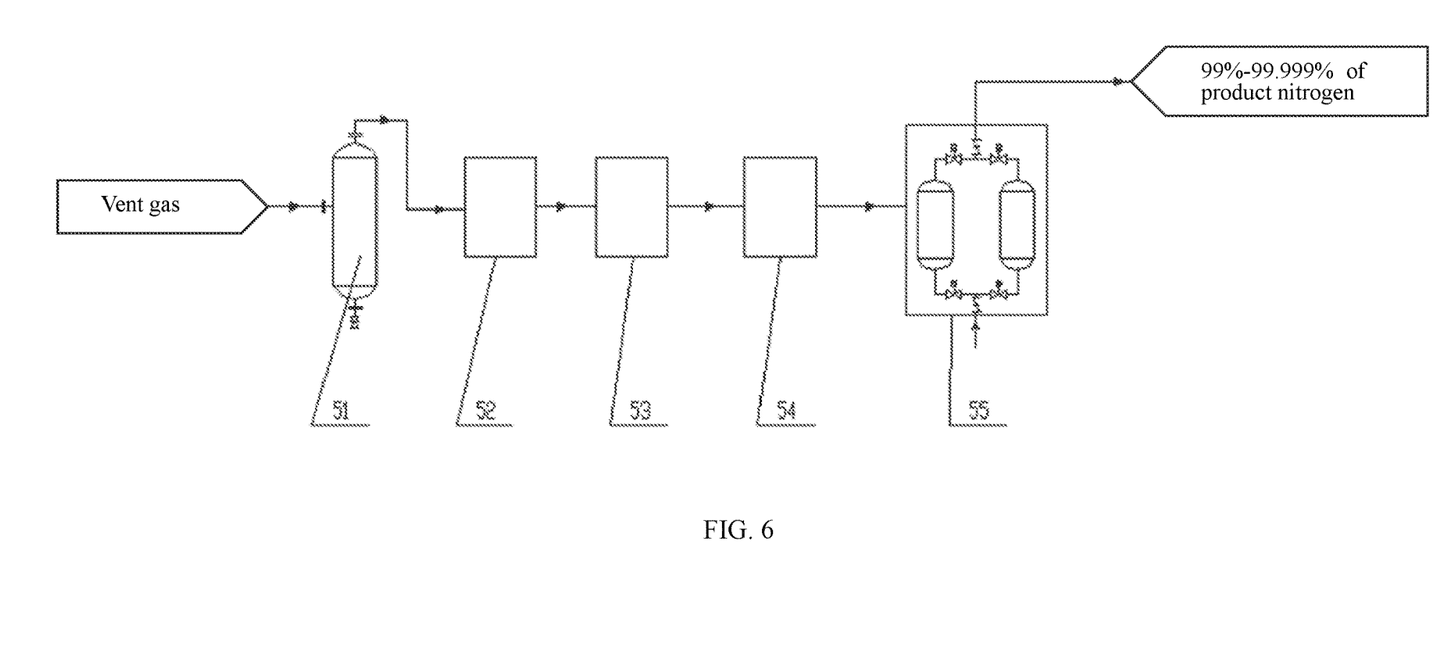
FIG. 6 is a schematic flowchart of the nitrogen concentration and purification system in the example of the present disclosure.

As shown in FIG. 6, in the optional example of the present disclosure, the nitrogen concentration and purification system 5 includes the third buffer tank 51, the nitrogen compressor 52, the second dryer 53, the filter 54 and the third adsorption column set 55, and the third adsorption column set 55 includes the plurality of third adsorption columns arranged in parallel, and the third adsorption columns are filled with the third adsorbent; wherein, the inlet of the third buffer tank 51 is communicated with the vent gas of the carbon and nitrogen separation system 2 and the carbon dioxide secondary purification system 3, the outlet of the third buffer tank 51 is communicated with the inlet of the nitrogen compressor 52, the outlet of the nitrogen compressor 52 is communicated with the inlet of the second dryer 53, the outlet of the second dryer 53 is communicated with the inlet of the filter 54, the outlet of the filter 54 is communicated with the gas inlet of the third adsorption column set and the product nitrogen is obtained at the top gas outlet of the third adsorption column set 55.

Optionally, the adsorption pressure of the third adsorption column is 0.7-1.0 MPa (such as 0.7 MPa, 0.75 MPa, 0.8 MPa, 0.9 MPa or 1.0 MPa), and the volume concentration of the product nitrogen is 99%-99.999%.

It can be understood that the two stages of the vent gas generated by the carbon and nitrogen separation system 2 and the carbon dioxide secondary purification system 3 is recovered by the nitrogen concentration and purification system 5 of the present disclosure, and after compression and filtration, the gas at a pressure of 0.7-1.0 MPa is entered into the third adsorption column, which is filled with the third adsorbent. For the vent gas with complex components, it has a high recovery rate, and after multi-column pressure swing adsorption separation, the product nitrogen with a volume concentration of 99%-99.999% is obtained on the column-top.

It should be noted that the first adsorbent, the second adsorbent and the third adsorbent used in the present disclosure are all existing adsorbents.

The present disclosure also provides a method for synchronously recovering nitrogen and carbon dioxide from boiler flue gas, which uses the system for synchronously recovering nitrogen and carbon dioxide from boiler flue gas as described above, the method includes the following steps:

step (1): introducing the boiler flue gas into the flue gas pretreatment system for dehydrating and cooling to obtain the pretreated flue gas;

step (2): introducing the pretreated flue gas into the carbon and nitrogen separation system, performing pressure swing adsorption pretreatment, and separating the nitrogen-containing vent gas and the crude carbon dioxide gas, wherein, the adsorption pressure of the carbon and nitrogen separation system is 0.20-0.40 MPa;

step (3): introducing the crude carbon dioxide gas separated from the carbon and nitrogen separation system into the carbon dioxide secondary purification system for secondary purification to obtain the purified carbon dioxide gas and generate the vent gas;

step (4): introducing the nitrogen-containing vent gas separated from the carbon and nitrogen separation system and the vent gas generated by the carbon dioxide secondary purification system into the nitrogen concentration and purification system for purifying to obtain the product nitrogen;

preferably, after step (3), the method for synchronously recovering nitrogen and carbon dioxide from boiler flue gas also includes: step (31), introducing the purified carbon dioxide gas into the carbon dioxide refining and liquefaction system for refining treatment to obtain the refined carbon dioxide gas.

The following is a detailed explanation of system and method for synchronously recovering nitrogen and carbon dioxide from boiler flue gas of the present disclosure through a specific example.

The example of the present disclosure is used for recovery of carbon dioxide and nitrogen from flue gas of a coal power plant, and the carbon dioxide gas is used to increase the income of smart agriculture, and the nitrogen is used to replace and purge the chemical plant of the factory. Wherein, the compositions of the flue gas is shown in TABLE 1 as below.

TABLE 1 the compositions of the flue gas

| Compositions | Sulfur dioxide | Nitrogen oxide | Carbon monoxide | Carbon dioxide | Oxygen gas | Water |
|---|---|---|---|---|---|---|
| Measured value | 0 mg/m³ | 31 mg/m³ | Not detected | 13% | 6.20% | 12.50% |
| Detection limit | 2 mg/m³ | 2 mg/m³ | 20 mg/m³ | 0.03% | — | — |

As shown in FIGS. 1-6, the required flue gas is introduced from the flue gas discharge chimney after desulfurization and denitrification, and is entered into the first cooler 11 for preliminary cooling to about 35° C., is entered into the first gas-liquid separator 12 for gas-liquid separation, and then is entered into the flue gas induced draught fan 13. The gas outlet pressure of the flue gas induced draught fan 13 is 5 KPa.

The flue gas is entered from the outlet of the flue gas induced draught fan 13 into the flue gas compressor 21, when it is pressurized to 0.23 MPa, it is entered into the second gas-liquid separator 22, and then is entered into the first dryer 23 for deep dehydration, after that, it is entered into the first adsorption column set 24 for adsorption and separation. The vent gas with a nitrogen content of 88-90% is obtained on the column-top, which is used as the feed gas for nitrogen concentration and purification system. The desorption gas obtained on the column-bottom through the first vacuum pump 25 is a crude carbon dioxide gas with a carbon dioxide volume content of 45% and a pressure of 15 KPa.

The crude carbon dioxide gas with a content of 45% is compressed to 0.25 MPa through first carbon dioxide compressor 31, and it is entered into the third gas-liquid separator 32 for gas-liquid separation, and then is entered into the second adsorption column set 33 for further purification of carbon dioxide, the carbon dioxide secondary purification vent gas is obtained on the column-top, which is introduced into the raw gas pipeline of nitrogen concentration and purification system 5, the carbon dioxide gas with a purity of 95% and a pressure of about 15 kPa is desorbed and obtained through the second vacuum pump 34 on the column-bottom, which is stored in second buffer tank 35.

After 95% carbon dioxide gas is cooled and dehydrated again through the second cooler 41 and the fourth gas-liquid separator 42, the pressure thereof is increased to 2.5 MPa through the second carbon dioxide compressor 43, and then it is entered into the inlet of the fourth buffer tank 43a, the outlet of the fourth buffer tank 43a is communicated with the inlet of the desulfurization column set 44, and then it is orderly entered into the desulfurization column set 44 and the drying column set 45 for desulfurization and impurity removal, after it is entered into the third cooler 46 for cooling, is entered into the liquefaction module 47, which is cooled to −18° C. for returning to liquid state, and after liquid carbon dioxide is entered into the distillation module 48 for refining and purification, the column-bottom is 99.9% food grade carbon dioxide, which is stored in the carbon dioxide storage tank 49. The column-top vent gas is used as a regeneration gas source for desulfurization column set and drying column set, which saves the product gas and reduces energy consumption.

The vent gas produced by the column-top of the adsorption column in the carbon and nitrogen separation system 2 and the carbon dioxide secondary purification system 3 is entered into the third buffer tank 51, after that, it is entered into the nitrogen compressor 52, and is pressurized to 0.8-1.0 MPa, and then is entered into the second dryer 53 and the filter 54 for dehydration, drying, filtration, and purification, after that, it is entered into the third adsorption column set 55 for pressure swing adsorption to obtain the product nitrogen, with the purity ranging is from 99.5%-99.9%.

In this example, the carbon and nitrogen separation system adopts a low-pressure adsorption mode with an adsorption pressure of 0.25 MPa, which changes the prior art of adsorption at 1.0 MPa. Moreover, vacuum pump desorption is used for desorption, which not only reduces energy consumption but also improves the recovery rate of carbon dioxide. The nitrogen concentration and purification system adopts a secondary compression mode to increase the pressure from 0.23 MPa to 0.8-1.0 MPa, and only selects the compressor model based on the actual nitrogen content demanded by the users. Compared to compressors that compress a large amount of flue gas, the compressed gas volume here is only 68% of that of flue gas compression. In this example, the flue gas compression is increased from 0.01 MPa to 0.8-1.0 MPa, and the vent gas compression is increased from 0.23 MPa to 0.8-1.0 MPa. The compressed gas volume is also reduced to 68%, indicating that the energy-saving effect of the system of the present disclosure is obvious.

The foregoing descriptions are preferred examples of the present disclosure and are not intended to limit the present disclosure. For those skilled in the art, the present disclosure may have various changes and modifications. All modifications, identical replacements and improvements made without departing from the spirit and principle of the present disclosure shall be within the protection scope of the present disclosure.

We claim:

1. A system for synchronously recovering nitrogen and carbon dioxide from boiler flue gas, characterized in that, the system comprises:
   a flue gas pretreatment system used for dehydrating and cooling a boiler flue gas;
   a carbon and nitrogen separation system communicated with the flue gas pretreatment system, and used for performing pressure swing adsorption on a pretreated flue gas and separating a nitrogen-containing vent gas and a crude carbon dioxide gas, an adsorption pressure of the carbon and nitrogen separation system being 0.20-0.40 MPa;
   a carbon dioxide secondary purification system communicated with the carbon and nitrogen separation system, and used for performing secondary purification on the crude carbon dioxide gas separated from the carbon and nitrogen separation system; and
   a nitrogen concentration and purification system communicated with the carbon and nitrogen separation system and the carbon dioxide secondary purification system, and used for purifying the nitrogen-containing vent gas separated from the carbon and nitrogen separation system and a vent gas generated by the carbon dioxide secondary purification system.

2. The system for synchronously recovering nitrogen and carbon dioxide from boiler flue gas according to claim 1, characterized in that, the flue gas pretreatment system comprises a first cooler, a first gas-liquid separator and a flue gas induced draught fan, and an inlet of the first cooler is communicated with a boiler flue, an outlet of the first cooler is communicated with an inlet of the first gas-liquid separator, an outlet of the first gas-liquid separator is communicated with an inlet of the flue gas induced draught fan, and an outlet of the flue gas induced draught fan is communicated with the carbon and nitrogen separation system.

3. The system for synchronously recovering nitrogen and carbon dioxide from boiler flue gas according to claim 1, characterized in that, the carbon and nitrogen separation system comprises a flue gas compressor, a second gas-liquid separator, a first dryer, a first adsorption column set, a first vacuum pump and a first buffer tank, and the first adsorption column set comprises a plurality of first adsorption columns arranged in parallel, each first adsorption column is filled with a first adsorbent;
   wherein, an inlet of the flue gas compressor is communicated with the flue gas pretreatment system, an outlet of the flue gas compressor is communicated with an inlet of the second gas-liquid separator, an outlet of the second gas-liquid separator is communicated with an inlet of the first dryer, an outlet of the first dryer is communicated with a gas inlet of the first adsorption column set, a top vent gas of the first adsorption column set is a nitrogen-containing vent gas, a bottom vent gas is a crude carbon dioxide gas, a column-top gas outlet of the first adsorption column set is communicated with the nitrogen concentration and purification system, a column-bottom gas outlet of the first adsorption column set is communicated with an inlet of the first vacuum pump, an outlet of the first vacuum pump is communicated with an inlet of the first buffer tank, and an outlet of the first buffer tank is communicated with the carbon dioxide secondary purification system.

4. The system for synchronously recovering nitrogen and carbon dioxide from boiler flue gas according to claim 3, characterized in that, a volume concentration of nitrogen in the nitrogen-containing vent gas is 88%-90%, and a volume concentration of carbon dioxide in the crude carbon dioxide gas is 45%-80%.

5. The system for synchronously recovering nitrogen and carbon dioxide from boiler flue gas according to claim 1, characterized in that, the carbon dioxide secondary purification system comprises a first carbon dioxide compressor, a third gas-liquid separator, a second adsorption column set, a second vacuum pump and a second buffer tank, and the second adsorption column set comprises a plurality of second adsorption columns arranged in parallel, each second adsorption column is filled with a second adsorbent;
   wherein, an inlet of the first carbon dioxide compressor is communicated with the carbon and nitrogen separation system, an outlet of the first carbon dioxide compressor is communicated with an inlet of the third gas-liquid separator, an outlet of the third gas-liquid separator is communicated with a gas inlet of the second adsorption column set, a column-top gas outlet of the second adsorption column set is communicated with the nitrogen concentration and purification system, a column-bottom gas outlet of the second adsorption column set is communicated with an inlet of the second vacuum pump, and an outlet of second vacuum pump is communicated with an inlet of the second buffer tank.

6. The system for synchronously recovering nitrogen and carbon dioxide from boiler flue gas according to claim 1, characterized in that, the nitrogen concentration and purification system comprises a third buffer tank, a nitrogen compressor, a second dryer, a filter and a third adsorption column set, and the third adsorption column set comprises a plurality of third adsorption columns arranged in parallel, and the third adsorption columns are filled with a third adsorbent;
   wherein, an inlet of the third buffer tank is communicated with the carbon and nitrogen separation system and the carbon dioxide secondary purification system, an outlet of the third buffer tank is communicated with an inlet of the nitrogen compressor, an outlet of the nitrogen compressor is communicated with an inlet of the second dryer, an outlet of the second dryer is communicated with an inlet of the filter, an outlet of the filter is communicated with a gas inlet of the third adsorption column set, and a product nitrogen is obtained at a top gas outlet of the third adsorption column set.

7. The system for synchronously recovering nitrogen and carbon dioxide from boiler flue gas according to claim 6, characterized in that, an adsorption pressure of the third adsorption column is 0.7-1.0 MPa, and a volume concentration of the product nitrogen is 99%-99.999%.

8. The system for synchronously recovering nitrogen and carbon dioxide from boiler flue gas according to claim 1, characterized in that, the system also comprises a carbon dioxide refining and liquefaction system, and the carbon dioxide refining and liquefaction system is communicated with the carbon dioxide secondary purification system for refining the carbon dioxide.

9. The system for synchronously recovering nitrogen and carbon dioxide from boiler flue gas according to claim 8, characterized in that, the carbon dioxide refining and liquefaction system comprises a second cooler, a fourth gas-liquid separator, a second carbon dioxide compressor, a fourth buffer tank, a desulfurization column set, a drying column set, a third cooler, a liquefaction module, a distillation module and a carbon dioxide storage tank;

wherein, an inlet of the second cooler is communicated with the carbon dioxide secondary purification system, an outlet of the second cooler is communicated with an inlet of the fourth gas-liquid separator, an outlet of the fourth gas-liquid separator is communicated with an inlet of the second carbon dioxide compressor, an outlet of the second carbon dioxide compressor is communicated with an inlet of the fourth buffer tank, an outlet of the fourth buffer tank is communicated with an inlet of the desulfurization column set, an outlet of the desulfurization column set is communicated with an inlet of the drying column set, an outlet of the drying column set is communicated with an inlet of the third cooler, an outlet of the third cooler is communicated with an inlet of the liquefaction module, an outlet of the liquefaction module is communicated with an inlet of the distillation module, and a bottom outlet of the distillation module is communicated with the carbon dioxide storage tank.

\* \* \* \* \*